May 7, 1940.                    H. E. IVES                    2,199,433
              OPTICAL SCANNING APPARATUS USING MIRROR HELIX
                         Filed Jan. 31, 1936
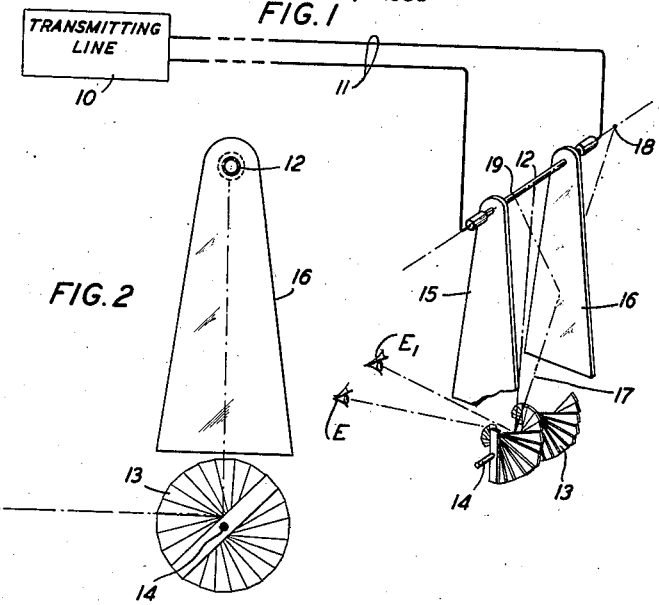
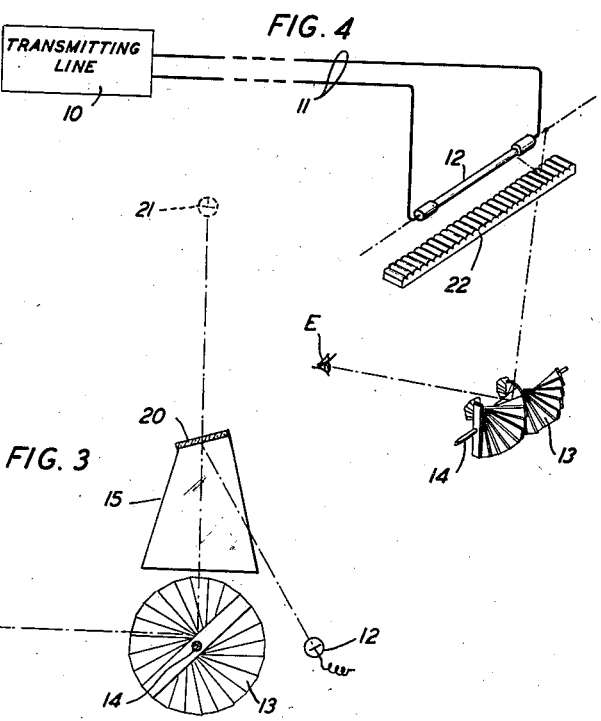
INVENTOR
H. E. IVES
BY
ATTORNEY Patented May 7, 1940

2,199,433

UNITED STATES PATENT OFFICE 2,199,433

OPTICAL SCANNING APPARATUS USING MIRROR HELIX

Herbert E. Ives, Montclair, N. J., assignor to Bell Telephone Laboratories, Incorporated, New York, N. Y., a corporation of New York Application January 31, 1936, Serial No. 61,675

18 Claims. (Cl. 178—7.3)

This invention relates to optical scanning apparatus and more particularly to a mirror helix employed for television scanning apparatus.

It is well known that a mirror helix when employed in combination with a strip light source supplied with current modulated in accordance with the light tone values of successively scanned elemental areas of the object to be televised may be viewed directly to present to the eye an image of the object. This strip light source must be much longer than the dimension of the helix along its axis of rotation, if appreciable latitude of movement in the direction of the axis is to be given the observer, or if a plurality of observing positions in this direction are to be provided. A capillary glow lamp is ordinarily used as the light source and when this lamp is lengthened it becomes more costly to construct and more difficult to use. If a plurality of viewing positions are provided it is advantageous to have the axis of the mirror helix in a horizontal position so that the several observers may sit side by side when viewing the image. Moreover, this position of the helix is advantageous when there is a single observer because each of the reflected beams of light is then incident simultaneously on both eyes.

It is an object of this invention to provide means for increasing the apparent length of the strip light source used for the mirror helix without any actual increase in length, whereby the above-mentioned difficulties are obviated.

In one embodiment of the invention, hereinafter described in detail, the light source is effectively greatly lengthened by providing two parallel mirrors extending from the region of the extremities of the lamp toward the axis of the mirror helix to regions near the two opposite sides of the helix, respectively.

It has been discovered that mirrors so placed give the effect when a mirror helix is in operation of providing a greatly extended light source, thus making it practical for a number of observers to simultaneously view the mirror helix or for a single observer to view the helix from a plurality of positions along a line parallel to its axis. The whole apparatus for such viewing now becomes more compact, less costly and less troublesome to maintain in correct operation. To secure the maximum advantage, the mirrors must extend up to the helix and when so extended the ends of the mirrors nearer the helix obstruct the image. This difficulty, if present, is overcome by mounting the light source above or below the mirror helix so that the light is incident upon the helix at approximately right angles to the viewing line. This construction has the additional advantage over that ordinarily used in that the light source is removed from the viewing area in front of the helix and placed in a position such that the apparatus as a whole takes less floor or table space. However, if in special cases not sufficient space is available above the helix, the light source may be placed behind the helix and approximately in the horizontal plane including the axis of rotation and an additional mirror placed above the helix, thereby considerably reducing the vertical space required.

When the light source is arranged, either actually or effectively, above or below the mirror helix as above indicated, the average position of the mirror helix element during the scanning operation is at 45 degrees to the horizontal plane. As a consequence of this, the image of an elemental line is foreshortened and the element should therefore be made longer than when viewed substantially along the line of illumination. In the particular case mentioned the element should be increased in length in the ratio of $$\sqrt{2} \text{ to } 1$$

In accordance with a modified form of the invention, the effective length of the light source may be increased by placing between the source and the helix a piece of ribbed or cylindrically lenticulated light transmitting material, such as glass, parallel to the light source with its lenticulations or ribs perpendicular thereto and to the axis of the helix. The effect of this is to so diffuse the light that the light source appears to be extended laterally much beyond its physical limits. The use of the lenticulated glass has an additional advantage. It has been noted that a common defect of capillary gaseous discharge tubes is that they develop oscillations which shift in position along the capillary lamp in an erratic manner. If the light is diffused so that the light at any one point of observation is the summation of radiations coming from various parts of the tube, the effect of these oscillations is averaged and thus practically eliminated. A corrugated glass plate introduced in accordance with the invention is found to be quite effective in performing this optical averaging operation.

The following is a more detailed description of the invention, reference being made to the drawing in which:

Fig. 1 is a perspective view of an arrangement for increasing the apparent length of the capillary light source;

Fig. 2 is a side elevation view of the apparatus shown in Fig. 1;

Fig. 3 shows a modification of the apparatus shown in Figs. 1 and 2; and,

Fig. 4 shows another arrangement for producing the desired result.

Referring more particularly to the drawing, incoming image currents modulated in accordance with the tone values of successively scanned elemental areas of elemental strips of a field of view at the transmitting station 10 and transmitted over wire or radio channels 11 are impressed upon a strip light source 12 which preferably comprises a gas-filled capillary lamp of any well-known type.

The light from the source 12 is directed upon a mirror helix 13 having a horizontal axis 14. This helix comprises a number of rectangular strips threaded on the shaft 14 and progressively annularly displaced. This helix may be constructed in accordance with the disclosure in Patent 1,964,580, issued June 26, 1934, to H. E. Ives. The reflecting faces of the mirror elements of the mirror helix 13 may be made concave cylindrical surfaces as also described in that patent. In this way the light source 12 may be located closer to the mirror helix 13 for a given position of the observer's eye E than in the case where the reflecting surfaces are plane mirrors. If desired, the reflecting surfaces may take any other known shape.

In order that the mirror helix may be viewed from a plurality of viewing positions, such as E, E₁, etc., it is advisable to have a capillary light source as long as possible in order that a complete view of the image on the helix may be obtained from any of the positions. As described above, it is often difficult and costly to make an extremely long capillary lamp. The effect of a capillary lamp much longer than the width of the mirror helix may, however, be produced without making the light source itself any longer. The apparatus for producing this result will now be described.

To produce the effect of a greatly lengthened capillary lamp, there are provided two parallel mirrors 15 and 16 extending from the region of the extremities of the lamp 12 toward the axis of the mirror helix 13 to regions near the two opposite sides of the helix, respectively. Mirrors so placed give the effect, when the mirror helix is in operation, of providing a greatly extended light source. For example, optical ray 17 appears to come from a point 18 located along the extension of light source 12 instead of actually coming from point 19 located within the source 12.

The mirrors preferably extend up to the helix in order to secure the maximum advantage of the arrangement. When so extended the ends of the mirrors 15 and 16 nearest the helix obstruct the image but this difficulty may be overcome by mounting the light source 12 above or below the mirror helix so that the light is incident upon the helix at approximately right angles to the viewing line as shown in Figs. 1 and 2. This arrangement removes the light source from the viewing area in front of the helix and permits a much more compact apparatus. It is to be understood, however, that this invention is not limited to this specific arrangement as the light source 12 may be located in front of the mirror helix and still be operative.

In some situations it is not practical to locate the source 12 above the mirror helix 13 as shown in Figs. 1 and 2 because of the lack of vertical space. In such a situation an arrangement such as that disclosed in Fig. 3 may be used. In this figure the source 12 is placed behind the helix 13 and approximately in the horizontal plane including the axis of rotation 14, and an additional mirror 20 is placed above the helix. As the light incident upon the helix 13 appears to come from a point 21 which is located above the mirror 20, a distance equal to that between the mirror 20 and the helix 13, the vertical space required is decreased substantially. The mirrors 15 and 16 are similar to those disclosed in Figs. 1 and 2 and perform the same function, but they are not required to be as long as those used in those figures.

When the arrangement of helix and light source is as shown in Figs. 1, 2 or 3, the effective means position of each mirror helix element during the scanning operation is at 45 degrees to the horizontal plane and the image of the elemental line is foreshortened. The mirror elements should therefore be made longer than when the lamp is on the same side of the helix as the observers. For an inclination of 45 degrees, this element should be increased in length in the ratio of $$\sqrt{2} \text{ to } 1$$

Fig. 4 shows another arrangement for increasing the effective length of the light source. In this arrangement an array 22 of small light deflecting elements which may take the form of parallel ribs on a glass plate, which may be longer than the strip light source 12, is placed between the source 12 and the helix 13, parallel to the light source with the deflecting elements or ribs perpendicular thereto and to the axis of the helix. The effect of this light deflecting element is to produce by refraction rays of light of such direction that they appear to originate at points outside the lamp and lying on its axis.

The light deflecting means just described has an additional function which increases the value of its use. Capillary gaseous discharge tubes have the common defect that they develop oscillations which shift in position along the capillary in an erratic manner. The ribbed glass plate 22 averages out the effect of these oscillations as light reaching any observing position no longer originates at a single elemental area of the lamp but at a number of such areas.

Various modifications of the embodiments of the invention herein described may obviously be made without departing from the spirit of the invention, the scope of the invention being defined by the appended claims.

What is claimed is:

1. The combination with a mirror helix of a strip light source parallel to the axis of rotation of said helix, and a pair of parallel mirrors positioned between said light source and said helix in planes substantially perpendicular to said axis.

2. The combination with a mirror helix of a strip light source located parallel to the axis of rotation of said helix and in a plane including said axis, the angle between said plane and the plane common to said axis and the viewing position being not greatly different than 90 degrees, and a pair of parallel mirrors extending substantially the entire distance between said light source and said helix in planes substantially perpendicular to said axis.

3. The combination with a mirror helix of a strip light source parallel to the axis of rotation of said helix, means for reflecting light from said strip light source towards said helix, and a pair of parallel mirrors positioned between said reflecting means and said helix in planes substantially perpendicular to said axis.

4. The combination with a mirror helix of a strip light source parallel to the axis of rotation of said helix, and means for producing the effect of lengthening said source and so extending the viewing field comprising a large number of light transmitting and deflecting means positioned side by side in a direction generally parallel to said source and effectively between said source and said helix.

5. The combination with a mirror helix of a strip light source parallel to the axis of rotation of said helix, and an array of small parallel elongated light deflecting elements arranged between said light source and said helix for deflecting light from said source only in planes in which the axis of said source lies.

6. The combination with a mirror helix of a strip light source parallel to the axis of rotation of said helix, and a mirror element extending from said source towards said helix for producing the effect of lengthening said source and so extending the viewing field.

7. The combination with a mirror helix of a strip light source parallel to the axis of rotation of said helix and located behind it with respect to the observer, a plane mirror for directing the light from said source upon said helix from a position above or below the axis of said helix, and a pair of stationary plane mirrors extending in parallel planes which are perpendicular to the axis of said helix from a region near said first plane mirror to a region near said helix for producing the effect of lengthening said light source and so extending the viewing field.

8. The combination with a mirror helix of a strip light source parallel to the axis of rotation of said helix, and a mirror element optically between said source and said helix for receiving light from said source and directing it toward said helix for producing the effect of lengthening said source and so extending the viewing field.

9. The combination with a mirror helix, of a strip light source parallel to the axis of said helix and at a distance therefrom less than the diameter of said helix, light reflecting means located above or below the positions of said helix and said source in such position that light from said source is reflected thereby to said helix, and optical means for receiving light from said source and directing it to said helix for producing the effect of lengthening said source and so extending the viewing field.

10. A television receiver comprising a plurality of relatively long narrow reflecting surfaces arranged side by side in a helix around an axis and adapted to rotate about said axis, a linear source of light spaced from said reflecting surfaces and having a length at least equal to the combined width of said surfaces measured along said axis, and means spaced from said reflecting surfaces and substantially perpendicular to the axis of said source to optically extend the length of said linear source of light.

11. A television receiver comprising a mirror drum having a plurality of relatively long narrow reflecting surfaces arranged side by side in a helix around the axis of the drum, a linear light source spaced from said drum and parallel to the axis thereof, and a mirror extending from said light source towards said drum, said mirror lying in a plane perpendicular to said light source and outside of a line drawn perpendicular to the axis of said drum through one of the end surfaces thereof.

12. A television receiving apparatus comprising a drum having a plurality of relatively long narrow reflecting surfaces arranged side by side in a helix around the axis of the drum, a linear source of light spaced from said drum and parallel to the axis thereof, and a mirror extending from said light source towards said drum, said mirror lying in a plane perpendicular to said light source and outside of planes perpendicular to the axis of said drum and including the end reflecting surfaces, the reflecting surface of said mirror being toward said last-mentioned planes.

13. A television receiver comprising a drum having a plurality of relatively long narrow reflecting surfaces arranged side by side in a helix around the axis of said drum, a linear source of light positioned parallel to the axis of said drum and spaced therefrom, and a pair of mirrors arranged parallel to each other and perpendicular to said light source with the reflecting surfaces towards each other, said mirrors extending from said light source to a point adjacent said drum and being spaced apart a distance equal at least to the axial length of said drum.

14. A television receiver comprising a plurality of relatively long narrow reflecting surfaces arranged side by side in a helix around an axis and adapted to rotate about said axis, a linear source of light spaced from said reflecting surfaces and having a length at least equal to the combined width of said surfaces measured along said axis, and means outside of the direct path between said source and said surfaces and substantially perpendicular to the axis of said source to optically extend the length of said source.

15. A television receiver comprising a mirror drum having a plurality of relatively long narrow reflecting surfaces arranged side by side in a helix around the axis of the drum, a linear light source spaced from said drum and parallel to the axis thereof, and a flat mirror extending from said light source towards said drum, said mirror lying in a plane perpendicular to said light source and outside of a line drawn perpendicular to the axis of the drum through one of the end surfaces thereof.

16. A television receiving apparatus comprising a drum having a plurality of relatively long narrow reflecting surfaces arranged side by side in a helix around the axis of the drum, a linear source of light spaced from said drum and parallel to the axis thereof, and a flat mirror extending from said light source towards said drum, said mirror lying in a plane perpendicular to said light source and outside of planes perpendicular to the axis of said drum and including the end reflecting surfaces, the reflecting surface of said mirror being toward said last-mentioned planes.

17. A television receiver comprising a drum having a plurality of relatively long narrow reflecting surfaces arranged side by side in a helix around the axis of said drum, a linear source of light positioned parallel to the axis of said drum and spaced therefrom, and a pair of flat mirrors arranged parallel to each other and perpendicular to said light source with the reflecting surfaces toward each other, said mirrors extending from said light source to a point adjacent said drum and being spaced apart a distance equal at least to the axial length of said drum.

18. The combination with a mirror helix of a strip light source parallel to the axis of rotation of said helix, and means for extending the viewing field comprising a plurality of identical elongated stationary light directing elements one portion of which receives light from said source and directs it to said helix so as to produce the effect of extending said source beyond one end thereof and another portion of which receives light from said source and directs it to said helix so as to produce the effect of extending said source beyond the other end thereof, each of said elements being symmetrical about a plane including its longitudinal axis and a line parallel thereto lying in a surface thereof, said longitudinal axis being perpendicular to said light source.

HERBERT E. IVES.